United States Patent [19]

Doneen

[11] Patent Number: 4,842,357
[45] Date of Patent: Jun. 27, 1989

[54] INTEGRATED WAVELENGTH DIVISION MULTIPLEXED OPTICAL SENSOR

[75] Inventor: Patrick M. Doneen, Bellevue, Wash.

[73] Assignee: The Boeing Company, Seattle, Wash.

[21] Appl. No.: 229,612

[22] Filed: Aug. 8, 1988

[51] Int. Cl.$^4$ .............................................. G02B 6/10
[52] U.S. Cl. ............................. 350/96.12; 350/96.18; 370/3
[58] Field of Search ............... 350/96.12, 96.11, 96.18; 370/3

[56] References Cited

U.S. PATENT DOCUMENTS

| 3,145,291 | 8/1964 | Brainerd | 235/61.11 |
| 3,426,324 | 2/1969 | Manly | 340/146.3 |
| 3,576,430 | 4/1971 | Fickenscher et al. | 235/61.11 |
| 3,732,796 | 5/1973 | Marcy | 95/12 |
| 4,052,594 | 10/1977 | Davis | 235/61.11 E |
| 4,182,935 | 1/1980 | Chown | 179/15 AL |
| 4,525,834 | 6/1985 | Schenkel et al. | 370/3 |
| 4,546,466 | 10/1985 | Lopiccolo | 370/3 |
| 4,740,951 | 4/1988 | Lizet et al. | 370/3 |
| 4,773,063 | 9/1988 | Hunsperger et al. | 370/3 |
| 4,790,614 | 12/1988 | Imoto et al. | 350/96.12 |

FOREIGN PATENT DOCUMENTS 59-175232A 10/1984 Japan .
2152317A 7/1985 United Kingdom .

OTHER PUBLICATIONS

K. Nosu et al., "Multireflection Optical Multi/Demultiplexer Using Interference Filters," May 1979.
T. Suhara et al., "Monolithic Integrated Microgratings and Photodiodes for Wavelength Demultiplexing," Nov. 1981.
M. Kawachi et al., "Fabrication of SiO$_2$-TiO$_2$ Glass Planar Optical Waveguides by Flame Hydrolysis Deposition," Jun. 1983.
Y. Yamada et al., "Fabrication of a High Silica Glass Waveguide Optical Accessor," Jun. 1984.
Y. Yamada et al., "Guided-Wave Optical Wavelength-Division Multi/Demultiplexer Using High-Silica Channel Waveguides," Apr. 1985.
S. Sumida et al., "High-Silica Guided-Wave Hybrid Optical Transmitting-Receiving Module," Apr. 1986.
S. Sumida et al., "Low Radiation Loss Branching/Combining of Optical Circuits Using High-Silica Channel Waveguides," Dec. 1986.
Y. Yamada et al., "Single-Mode Optical Fiber Connection to High-Silica Waveguide with Fiber Guiding Groove," Dec. 1987.
A. Himeno et al., "Guided-Wave Optical Gate Matrix Switch," Jan. 1988.

Primary Examiner—James W. Davie
Attorney, Agent, or Firm—Christensen, O'Connor, Johnson & Kindness

[57] ABSTRACT

An optical sensor system for multiplexing a plurality of channels conveying information encoded by light reflected from areas on a moving surface. An optical sensor head (10,10') is connected to a plurality of discrete wavelength light sources (122,126,130) by an optical fiber (14). Alternatively, a single source 70 of relatively wide spectral bandwidth may be coupled to the optical fiber. Light is conveyed by the optical fiber to the optical sensor head, passes through a waveguide channel to a plurality of branching junctions (18 and 42) long pass interference filters (20 and 44) are disposed. Light having a wavelength shorter than a predetermined value is reflected into a branching waveguide channel (24 and 48), while light having a longer wavelength is transmitted through the filter. Light that passes through both of the long pass interference filters enters a waveguide channel (60). In one embodiment, the three branching waveguide channels terminate in lenses (26, 50 and 62), so that light traveling through the waveguide channels is collimated or focused on reflective areas of a moving surface (30), reflecting back from reflective areas (32) into the lenses. The reflected light is thus modulated, so that it conveys one bit of the data encoded on the surface. The modulated light reflects from the long pass interference filters, and propagates back through the optical fiber to a demultiplexer (142). In another preferred embodiment, the lenses are omitted. Additional channels may be provided to increase resolution by adding other long pass interference filters and demultiplexer channels.

20 Claims, 3 Drawing Sheets

Fig. 5.

INTEGRATED WAVELENGTH DIVISION MULTIPLEXED OPTICAL SENSOR

TECHNICAL FIELD

This invention generally pertains to an optical sensor, and specifically, to a wavelength division multiplexed optical sensor.

BACKGROUND OF THE INVENTION

In controlling a mechanical system, it may be necessary to sense the relative motion or position of a moving member. To accomplish this task, optical sensors have been developed for scanning a light reflective pattern applied to the surface of the member being monitored. Light reflected from the surface is modulated by the pattern, producing an optical signal that encodes the motion of the surface relative to the sensor and thus defines its position. By using multiple reflected light channels, each conveying the status (1 or 0) of one bit of a digitally encoded signal, the optical sensor can directly determine either rotary or linear position of the surface, with a resolution dependent only on the number of channels (or bits) employed.

Prior art optical sensors have been constructed using bundles of micro-optical fibers for splitting and coupling light reflected from a moving surface. Construction of an optical sensor head using the previously known techniques is labor-intensive, requiring many man-hours of skilled, tedious work with the bundles of micro-optical fibers. In one design, 108 micro-optical fibers are used in the bundle for each channel of encoded data. The cost of constructing optical sensors in production quantities using such techniques, particularly with more than three channels, is too high to be commercially acceptable.

Use of a waveguide for constructing an optical sensor has generally been considered impractical in the past, due to the newness of waveguide technology and the relatively high losses associated with branching circuits formed in a waveguide. Recently, however, a new technique has been developed for producing high-silica channel waveguides having an additional low refractive index layer at the branching junction between two waveguide channels, which reduces radiation loss. In a paper entitled, "Low Radiation Loss Branching/Combining of Optical Circuits Using High-Silica Channel Waveguides," published in the *Journal of Light Wave Technology*, Vol. LT-4, No. 12, Dec. 1986, S. Sumida, K. Magari, and M. Kawachi explain this technique and indicate that it can be used to make a wavelength division multiplexer/demultiplexer.

A wavelength division multiplexer typically includes multiple sources of light, each operating at a discrete, different frequency. Light from the different sources is modulated to convey information or data in a plurality of channels, and the multiplexer combines the different wavelengths of modulated light into a single channel. Conversely, an optical wavelength demultiplexer splits light comprising different wavelengths into separate channels. Each channel is connected to a light detector, such as an avalanche of PIN photodiode, which is sensitive to that wavelength, and which produces an electrical signal corresponding to the data encoded on that channel.

There is clearly an advantage in multiplexing data, since a multiplexed optical sensor can convey data for all channels scanned by the sensor on a single optical fiber. The bundled micro-optical fibers from the prior art optical sensor head could of course be separately connected to the individual inputs of the waveguide multiplexer described in the above reference; however, there would be no reduction in fabrication costs of the sensor; in fact, the overall costs of the system would be substantially higher.

Accordingly, it is an object of this invention to integrate an optical sensor and a wavelength division multiplexer in a single device. It is a further object to reduce the production costs for manufacturing an optical sensor having a plurality of channels for sensing motion and position of a surface. These and other objects and advantages of the present invention will be apparent from the attached drawings and the Description of the Preferred Embodiments that follows.

SUMMARY OF THE INVENTION

In accordance with the present invention, a wavelength division multiplexed optical sensor is provided for use with a source of light comprising either a broadband spectrum or a plurality of discretely different wavelengths. The optical sensor includes a silicon substrate on which are formed a plurality of light conductive channels. Pairs of the light conductive channels meet at a plurality of spaced apart junctions disposed in a source path along which one of the light conductive channels comprising each pair is aligned. The other light conductive channel of each pair defines a sensor path directed toward an edge of the substrate. With respect to the direction that light propagates along the source path from the source, the pairs of light conductive channels define an acute angle at each junction.

A plurality of filters are provided, each having a different reflectance characteristic wavelength associated with it. Each filter is disposed at one of the junctions, so as to reflect light of the characteristic wavelength through the acute angle and into the light conductive channel defining the sensor path, while permitting light having other wavelengths to continue to propagate along the source path.

Disposed at the distal end of each sensor path are means for optically coupling the sensor paths to a surface having variable reflectance properties. Light of different characteristic wavelengths conveyed along each sensor path is reflected from the surface and travels back along the sensor path in the opposite direction. This light is reflected from the filter at the junction and is conveyed toward the source along the source path.

The variable reflectance of the surface represents encoded data. Light of different characteristic wavelengths reflected back toward the source from the surface is modulated in intensity by the variable reflectance to convey the encoded data to an optical demultiplexer. In one preferred embodiment, the reflectance of the surface varies between two substantially different values, so that the data are digitally encoded as binary bits, each defining a digital word. Each bit is represented by the light reflected back from the surface to one of the sensor paths. In another preferred embodiment, the data are analog, and the reflectance of the surface varies over a range of values. In both embodiments, the means for optically coupling may comprise a lens disposed at the distal end of each sensor path, which is focused on the surface. The surface may either be rotated or moved linearly with respect to the lenses.

DESCRIPTION OF THE PREFERRED EMBODIMENTS

Figures 1, 4, 6, 7, 8:
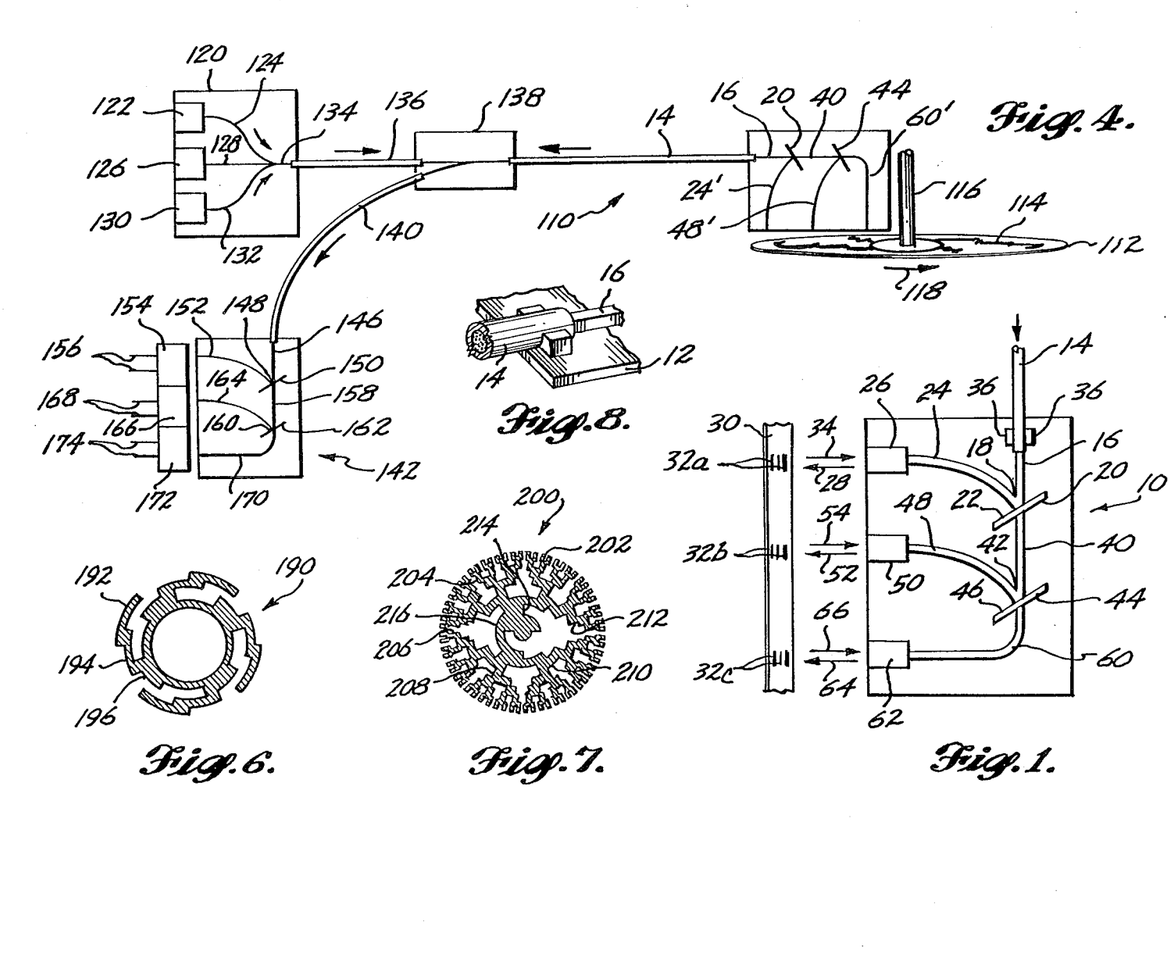
FIG. 1 is a schematic plan view of a wavelength division multiplexed optical sensor.
FIG. 4 is a schematic plan view of an optical sensor system including separate light sources and a separate demultiplexer.
FIG. 6 is a digitally encoded three-bit binary pattern for a rotating disk.
FIG. 7 is a digitally encoded eight-bit binary pattern for a rotating disk.
FIG. 8 is an isometric view of a portion of the waveguide, illustrating attachment of an optical fiber in an abutting relationship to a light conductive channel on the waveguide.

With reference to FIG. 1, an optical sensor head is generally denoted by reference numeral 10. The optical sensor head includes a waveguide substrate 12 on which an optical fiber 14 is terminated adjacent one edge. The end of optical fiber 14 abuts a waveguide channel 16, and is axially aligned with it so that light propagating through the optical fiber passes into waveguide channel 16. Conversely, light propagating along waveguide channel 16 in the opposite direction passes back into optical fiber 14 at the point in which the two are joined. The opposite end of optical fiber 14 is connected to a light source (not shown in FIG. 1), having either a relatively broad spectrum, or alternatively, comprising a plurality of discrete light sources, each emitting light of different wavelengths. Light propagating through optical fiber 14 toward optical sensor head 10 is thus coupled into waveguide channel 16 and directed towards a branching junction 18.

At branching junction 18 is disposed a long pass interference filter 20, having a front surface 22 that reflects light at a wavelength below a predetermined value, allowing longer wavelength light to pass through the long pass interference filter. Reflected light from the front surface 22 of the filter is reflected into a waveguide channel 24 that branches from waveguide channel 16 at an acute angle, approximately 30° in the preferred embodiment. Waveguide channel 24 curves toward one edge of the waveguide substrate 12, terminating at a lens 26. The lens is positioned to emit light in the direction indicated by arrow 28, thereby illuminating a portion of an adjacent moving surface 30. Surface 30 moves linearly past optical sensor head 10, in a direction generally normal to it. The surface includes a plurality of reflective areas 32 disposed adjacent lens 26, such that light emerging from the lens is reflected back from the reflective areas as indicated by arrow 34, re-entering lens 26. Lens 26 serves both to collimate or focus the light onto the reflective areas 32a, and to gather light reflected from those areas for transmission back through waveguide channel 24. Reflective areas 32a may comprise a relatively thin gold coating deposited on the surface, and etched to form bars or stripes. Surface 30 has either a high transmissivity coefficient or relatively high adsorption coefficient for a broad spectral band. The relative size, disposition and frequency of occurrence of reflective surfaces, by modulating the light traveling back toward lens 26, for transmission to a remote sensor.

Light that is not reflected by front surface 22 of long pass interference filter 20 propagates through the filter into a waveguide channel 40, through which it is conveyed toward a branching junction 42. At branching junction 42 is disposed a long pass interference filter 44 having a front surface 46, which reflects light having a wavelength less than a predetermined value into a waveguide channel 48. Waveguide channel 48 forms an acute angle with waveguide channel 40 (also 30° in the preferred embodiment), and curves toward the same edge of waveguide substrate 12 as waveguide channel 24, terminating at and coupled to a lens 50. Light emerging from lens 50 travels in the direction indicated by arrow 52 toward surface 30, where it is reflected by reflective areas 32b back toward lens 50 as indicated by arrow 54. Areas 32b are disposed on surface 30 in alignment with the optical axis of lens 50 and the size, disposition and relative frequency of occurrence of the reflective areas encode a second channel of data for transmission back to the optical sensor. The reflected light travels back through lens 50, along waveguide channel 48, and is reflected from front surface 46 back through waveguide channel 40, passing through long pass interference filter 20 and into waveguide channel 16.

Light that has been transmitted through the optical fiber toward optical head 10, and which has passed through both long pass interference filters 20 and 44 passes into an optical waveguide channel 60, curving gradually toward a lens 62 disposed along the same edge of the waveguide substrate as lenses 26 and 50. The light emerges from lens 62 in the direction indicated by arrow 64, and is collimated or focused on a plurality of reflective areas 32c disposed on surface 30. The relative size, disposition and frequency of occurrence of reflective areas 32c encode a third channel of data, by modulating the light reflected back toward lens 62. The modulated light travels back in the opposite direction through waveguide channel 60, passing successively through long pass interference filter 44, waveguide channel 40 and long pass interference filter 20, into waveguide channel 16. From waveguide channel 16, light which has been modulated to convey the data encoded in each of the reflective areas 32 is conveyed back into optical fiber 14, traveling in the opposite direction toward the optical sensor.

The encoded data represented by the reflective areas on surface 30 can serve to indicate the speed with which the surface is moving relative to optical sensor head 10, or alternatively can indicate the absolute position of the surface. In this respect, although only three bits of data or channels are sensed by optical sensor head 10, much higher resolution may be achieved by expanding the optical sensor head to include additional long pass interference filters, waveguide channels, and lenses spaced apart along one edge of the waveguide substrate. Each additional long pass interference filter would include a front surface designed to reflect light of a predetermined wavelength substantially longer than a preceding long pass interference filter disposed along the path of the light from the source. The waveguide channel and lens disposed farthest from the source would thus be operative to convey light toward the surface having the longest wavelength relative to the other waveguide channels and lenses arrayed along the optic sensor head.

Figure 2:
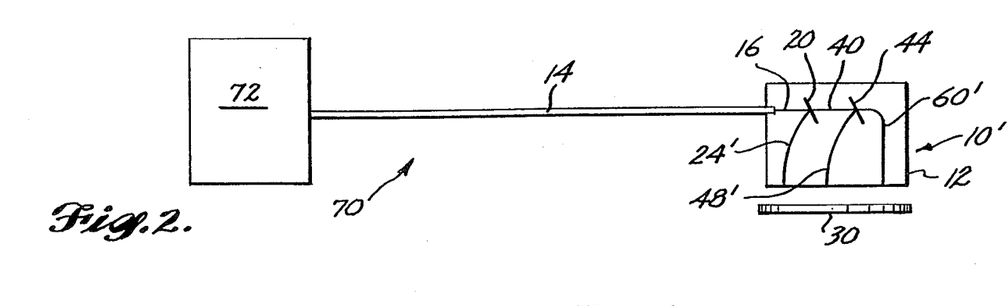
FIG. 2 is a schematic plan view of an optical sensor system including a source of light and a demultiplexer.

Lenses 26, 50 and 62 collimate or focus light on surface 30 to reduce light loss, and increase the signal strength of the modulated light reflected back from surface 30 by reflective areas 32. However, the lenses may not be required for certain applications, particularly if surface 30 is sufficiently close to the edge of waveguide substrate 12 from which light emerges. As shown in FIG. 2, a second embodiment of optical sensor head 10 is denoted by reference number 10'. Elements common to optical sensor head 10 and 10' are identified by the same reference numerals. In fact, optical sensor head 10' differs from optical sensor head 10 only in that it does not include lenses; instead, waveguide channels 24', 48' and 60' extend to the edge of waveguide substrate 12, which is polished to improve the coupling between the waveguide channels and the adjacent surface. These waveguide channels include the prime superscript to differentiate them from the similar waveguide channels on optical sensor head 10. Since optical sensor head 10' does not include lenses for focusing the light emitted from waveguide channels 24', 48' and 60', it has a substantially lower operating efficiency, and is thus less preferred, although substantially less expensive than the prior embodiment. As shown in FIG. 2, the complete optical sensor system is identified by reference numeral 70. It includes a combined light source, and demodulator/detector 72, which is connected to the optical sensor head by optical fiber 14.

Figure 3:
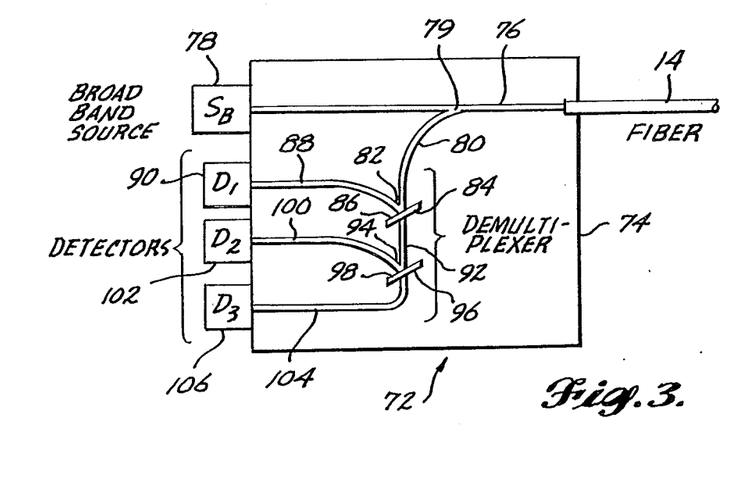
FIG. 3 is a schematic plan view of an integral source and demultiplexer.

Referring now to FIG. 3, details of the light source and combined demultiplexer/optical sensor are shown. Optical fiber 14 terminates at one side of a waveguide substrate 74, abutting and coupled to a waveguide channel 76 formed on the substrate in the same manner as on its opposite end. Waveguide channel 76 is axially aligned with optical fiber 14 at the point of contact between the two, and extends in a straight line to the opposite edge of the substrate, terminating at a broadband source 78. Source 78 preferably comprises a broadband LED or other relatively broadband source of light. Light emitted from source 78 passes along waveguide channel 76 and into optical fiber 14, by which it is transmitted to optical sensor head 10 or 10', as previously explained above. Modulated light traveling back through optical fiber 14 toward waveguide substrate 74 is coupled to and enters optical waveguide channel 76 and is split, a substantial part being directed into a waveguide channel 80 at an asymmetrical splitter junction 79. Splitter junction 79 is designed so that the majority of the light returning from the optical sensor head through waveguide channel 76 is directed into waveguide channel 80, rather than returning to the broadband source.

Waveguide channel 80 terminates at a branching junction 82, where a long pass interference filter is disposed that has the same spectral reflectivity and wavelength passband characteristics as long pass interference filter 20. Light reflected from long pass interference filter 84 enters a waveguide channel 88, disposed at an acute angle to waveguide channel 80, (preferably 30°) and is thereby conveyed toward a detector 90, which is coupled to the waveguide channel at the edge of substrate 74. Detector 90 is responsive to the intensity of the modulated light, and produces an electrical signal corresponding to the data conveyed by that light, as originally encoded on surface 30.

Light not reflected by long pass interference filter 84 passes through the filter, into a waveguide channel 92, and propagates to a branching junction 94. At branching junction 94 is disposed a long pass interference filter 96, having the same characteristics as long pass interference filter 44, which is disposed on the optical sensor head. Light reflected from long pass interference filter 96 enters a waveguide channel 100, disposed at an acute angle relative to waveguide channel 92, and is thereby conveyed to the edge of substrate 74, where it is coupled to a detector 102. Detector 102 produces an electrical signal corresponding to the second data channel encoded on moving surface 30, by reflective areas 32b.

Light not reflected by either of the long pass interference filters 84 and 96 enters a waveguide channel 104 and thus reaches a detector 106, disposed along the same edge of substrate 74 as detectors 90 and 102. Detector 106 likewise produces an electrical signal corresponding to the third data channel encoded in reflective regions 32c on surface 30. Detectors 90, 102 and 106 preferably comprise photo avalanche or PIN diodes. Alternatively, any light sensitive optical sensor may be used for detecting the modulated light reflected back through optical fiber 14.

FIG. 4 shows an alternative optical sensor system, generally denoted by reference numeral 110. In this embodiment, optical sensor head 10' is disposed in close proximity to a rotating disk 112 having a plurality of reflective surface areas 114 disposed thereon, to encode data representing three bits of information. Rotating disk 112 is attached to a rotating shaft 116, and is thus caused to rotate in the direction indicated by arrow 118. The reflective areas comprising each channel of data encoded on rotating disk 112 are disposed at a different radial distance from the center of shaft 116, so that they pass immediately below the terminal ends of waveguide channels 24', 48' and 60'. Light reflected from these areas on rotating disk 112 is multiplexed by optical sensor head 10' as described above, and the multiplexed signal propagates through optical fiber 14 toward an asymmetric splitter junction 138.

Unlike the preferred embodiment shown in FIG. 3, the preferred embodiment comprising optical sensor system 110 includes a separate light source for each of the three discrete wavelengths used for each channel of data multiplexed by optical sensor head 10'. A laser diode 122 produces light having a wavelength less than the predetermined wavelength reflected from long pass interference filter 20. Similarly, laser diode 126 produces light having a wavelength longer than that of laser diode 122 but shorter than the predetermined wavelength of light reflected from long pass interference filter 44. A third laser diode 130 produces light having a wavelength longer than that reflected from long pass interference filter 44. Laser diodes 122, 126 and 130 are respectively coupled to light wave channels 124, 128 and 132, on a substrate 120. Each of the waveguide channels 124, 128 and 132 are combined into a single waveguide channel 134, which is coupled to an optical fiber 136 along an opposite edge of the substrate. Thus, the light emitted from the laser diodes propagates through optical fiber 136 and into splitter 138. This light passes through splitter 138, propagating down optical fiber 14 and into optical sensor head 10', where it is split into the nominal respective wavelengths of the light produced by laser diodes 122, 126 and 130, illuminating the data encoded in the reflective areas upon the surface of rotating disk 112 as already explained.

Multiplexed and modulated light traveling from optical sensor head 10' is split at asymmetrical splitter junction 138 entering a branch optical fiber 140, which provides a light path between optical splitter 138 and a demultiplexer 142. Optical fiber 140 is coupled to the end of a waveguide channel 146 formed on a substrate 144. Coupling of all optical fibers to waveguide substrates is accomplished as described with respect to optical fiber 14 (FIG. 1). Waveguide channel 146 extends from optical fiber 140 to a branching junction 148 where a long pass interference filter 150 is disposed that is equivalent to long pass interference filter 20. Light modulated by reflective surface areas 114 on rotating disk 112, which has traveling along waveguide channel 24' is reflected from long pass interference filter 150 into waveguide channel 152, through which it is conveyed to an optical detector 154. The optical detector converts the modulated light intensity levels into an electrical signal output over leads 156. Light traveling through waveguide channel 146, which is not reflected from long pass interference filter 150 enters a waveguide channel 158. At a branching junction 160, light having a wavelength corresponding to that produced by laser diode 126 is reflected from a long pass interference filter 162 into a waveguide channel 164. Long pass interference filter 162 corresponds to long pass interference filter 44, having similar reflectance and transmission characteristics. Light entering waveguide channel 164 has been modulated in response to the reflective surface areas 114 associated with waveguide channel 48', and the modulation causes an optical detector 166, which is coupled to waveguide channel 164, to produce an electrical signal corresponding to the encoded data.

Light which has not been reflected by either of long pass interference filters 150 or 162 passes into a waveguide channel 170, and is thus conveyed to an optical detector 172, producing an electrical signal output over leads 174 that corresponds to the encoded data conveyed by the light reflected from reflective areas 114 that move past the terminal end of waveguide channel 60' on optical sensor head 10'. Preferably, optical detector 154, 166 and 172 comprise photo avalanche or PIN diodes, or equivalent light sensitive detectors.

FIGS. 6 and 7 illustrate two patterns for reflective areas, which may be applied to the surface of a rotating disk to encode the position of the disk as it rotates on shaft 116. In FIG. 6, only three bits or channels of data are encoded, corresponding to reflective areas 192, 194 and 196. For purposes of illustration, the areas of high reflectivity are shown as black bands extending in a constant radius arc part way around the surface of a rotating disk. The reflective areas for each channel of data are disposed at an appropriate radial spacing from the center of rotation of the disk so that they pass beneath the terminal ends of waveguide channels 24', 48' and 60', alternating with areas of relatively high transmissivity or absorption. The high contrast between the background of the disk surface and the reflectance of areas 192, 194 and 196 provides a good signal-to-noise ratio.

If instead of three channels, eight-data channels are provided on the optical sensor head, demultiplexer, and detector, an encoded data pattern 200 as shown in FIG. 7 may be used to encode the position and/or motion of the rotating disk with higher resolution. Data pattern 200 includes reflective surface areas 202 through 216, providing eight channels of data representing an eight bit digital word. The angular position of the disk can thus be resolved with a precision of about 1.41 degrees. Optionally, other numbers of data channels may be provided, depending upon the required resolution.

Instead of data that is digitally encoded as shown in FIGS. 6 and 7, an analog pattern may be applied to the surface of rotating disk 112 or to surface 30, thereby modulating light emitted from each of waveguide channels 24', 48' and 60' as an analog signal, for transmission to demultiplexer 142. The data encoded on the surface may be represented, for example, as a range of either discrete or continuously varying levels of reflectance.

It is also possible to digitally or analog encode data using areas of high transmissivity or absorption on a highly reflective background. In essence, the encoded light reflected from such a surface is the inverse of that described with respect to the encoding data using reflective areas.

In constructing optical sensor head 10 or 10', the techniques described in the above-identified paper by Sumida, Magari and Kawachi may be used to produce the desired pattern of waveguide channels on a silicon substrate. The process includes a flame hydrolysis deposition of a buffer layer of silicon dioxide on the silica substrate, followed by deposition of a core layer of silicon dioxide/titanium dioxide. Finally a cladding layer of silicone dioxide is deposited with an oxy-hydrogen torch. The pattern of waveguide channels on substrate 12 is defined by a photolithographic process using reactive ion etching. CVD-silicon dioxide cladding is then deposited on the sidewalls of the etched ridges defining the waveguide channels. Notches etched into the waveguides by this process are used to position the long pass interference filters 20 and 44, which are cemented in place. As shown in FIG. 8, optical fiber 14 is mounted to the substrate between mounting blocks 36, which are also formed during the photolithographic etching process. The "V" groove defined between the mounting blocks 36 positions the end of optical fiber 14 so that it is in proper axial alignment with waveguide channel 16, thereby reducing losses that would occur due to faulty alignment between the two elements.

Key to the operation of optical sensor head 10 and 10' (and of the demultiplexer) is the use of long pass interference filters having predetermined reflectance and transmission characteristics. The characteristics of the filters are generally determined by the coating applied to the front surface of the filter. This coating comprises a dielectric multilayer film either a quarter or onehalf wavelength thick. Up to 50 coats of the thin film may be applied to the substrate comprising the filter, providing a relatively steep cutoff frequency for reflection of light having less than a predetermined wavelength, and transmission of light having a longer wavelength. Long pass interference filters having such characteristics are available from Corion Corporation, as Type LL-750 for long pass interference filter 20 and Type LL-850 for long pass interference filter 44. The suffix "750" or "850" refers to the cutoff wavelength of light that is reflected from the filter (in nanometers).

Figure 5:
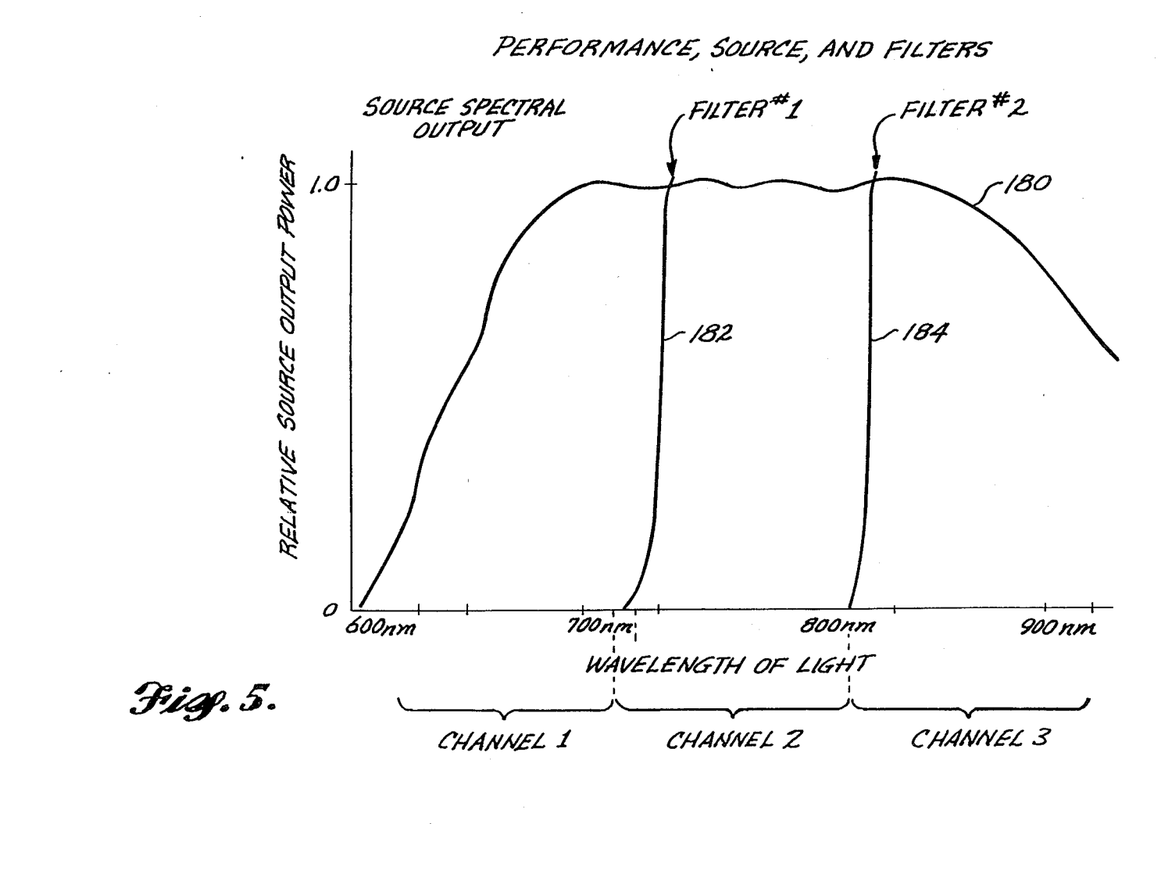
FIG. 5 is a graph showing the characteristic reflectance values for each filter of a three-channel optical sensor.

FIG. 5 illustrates the performance of two long pass interference filters with respect to their nominal cutoff reflectance wavelength. As shown in the figure, a relatively broadband source of light used with the filters covers a spectral range from a little more than 600 nanometers to more than 900 nanometers, as shown by line 180. The relative intensity of the source as a function of the wavelength of light is shown normalized for peak intensity of 1.0. A first long pass interference filter has a nominal cutoff reflectance wavelength of approximately 730 nanometers, i.e., it reflects light having a wavelength less than that, and transmits light having a longer wavelength, as shown by line 182. Similarly, a second long pass interference filter has a nominal cutoff reflectance wavelength of 800 nanometers, as identified by line 184. An optical sensor head including long pass interference filters having characteristics of the two filters shown in FIG. 5 would thus provide a first channel conveying modulated data using light having a wavelength in the range between approximately 600 nanometers to 730 nanometers, a second channel conveying data using light with a wavelength between approximately 730 nanometers and 800 nanometers, and a third channel conveying modulated data using light having a wavelength between approximately 800 nanometers and 920 nanometers.

An alternative optical sensor head (not shown) can be constructed using short pass filters that reflect light having a wavelength longer than a critical value and transmit light having a shorter wavelength. Each short pass filter disposed successively more distal from the source must have a lower critical wavelength than the preceding one. It would also be possible to produce a wavelength multiplexed optical sensor head using bandpass optical filters that transmit a band of spectral wavelengths and reflect all other wavelengths. Short pass and bandpass filters are commercially available from the same sources as long pass filters.

While the present invention has been disclosed with respect to several preferred embodiments and modifications thereto, those of ordinary skill in the art will understand that further modifications may be made within the scope of the claims that follow below. It is not intended that the scope of the invention be in any way limited to the description of the preferred embodiments, but instead, that it be defined entirely by reference to the claims.

The embodiments of the invention in which an exclusive property or privilege is claimed are defined as follows:

1. A wavelength division multiplexed optical sensor for use with a source of light having either a broad band of wavelengths or a plurality of discretely different wavelengths, said optical sensor comprising:
    a silicon substrate, including a plurality of light conductive channels thereon, pairs of said light conductive channels meeting at a plurality of spaced apart junctions disposed in a source path along which one of the light conductive channels comprising each pair is aligned, the other light conductive channel of each pair defining a sensor path directed toward an edge of the substrate, said pairs of light conductive channels defining an acute angle at each junction, with respect to the direction that light propagates along the source path from the source;
    a plurality of filters, each having a different reflectance characteristic associated with it, said filters each being disposed at one of the junctions so as to reflect light having a range of wavelengths determined by said reflectance characteristic associated with the filter through said acute angle and into the light conductive channel defining the sensor path, light having other wavelengths continuing to propagate along the source path;
    means disposed at the distal end of each sensor path for optically coupling the sensor paths to a reflective surface, light of the different characteristic wavelengths conveyed through each sensor path being reflected from said surface, traveling through the sensor path in the opposite direction, and being reflected from the filter at the junction back toward the source along the source path.

2. The optical sensor of claim 1, wherein the reflectivity of the surface represents encoded data, and wherein the light of different characteristic wavelengths reflected back toward the source from said surface is modulated in intensity by the reflectivity to convey said encoded data to an optical demultiplexer.

3. The optical sensor of claim 2, wherein the data are digitally encoded, the reflectivity of the surface varying between two substantially different values.

4. The optical sensor of claim 3, wherein the data comprise a plurality of bits defining a digital word, each bit of the digital word being represented by the light reflected back from the surface to one of the sensor paths.

5. The optical sensor of claim 2, wherein the data are analog, the reflectivity of the surface varying over a range of values.

6. The optical sensor of claim 1, wherein the means for optically coupling comprise a lens disposed at the distal end of each sensor path, said lens collimating light directed toward the surface.

7. The optical sensor of claim 1, further comprising an optical fiber disposed between the source of light and the source path defined by one of the light conductive channels, said optical fiber being terminated in a "V" groove formed on the silicon substrate.

8. The optical sensor of claim 1, wherein the filters comprise dielectric thin film filters.

9. In a system for sensing the motion and/or position of a surface using a source of light having either a broad band of wavelengths or a plurality of different wavelengths, an optical sensor, comprising:
    a silicon substrate coated with a plurality of layers of materials, each layer having a different characteristic index of refraction than an adjacent layer;
    a main light conductive channel formed in the layers coating said silicon substrate, said light conductive channel being connected to receive light via an optical fiber;
    a plurality of branch light conductive channels formed in the layers coating said silicon substrate, each branch light conductive channel joining the main light conductive channel at an acute angle relative to a direction from which light originally enters said main light conductive channel, forming a plurality of spaced apart junctions;
    disposed at each of said junctions, means for reflecting light having a particular range of wavelengths associated with the junction, said light propagating along the main light conductive channel from the optical fiber into the branch light conductive channel forming the junction, said means being further operative to transmit light having a wavelength other than said particular range of wavelengths along the main light conductive channel, the particular range of wavelengths of light associated with each junction being different, said means being further operative to reflect light having a wavelength within said particular range of wavelengths, which is propagating along the branch light conductive channel into said main light conductive channel, back toward the optical fiber; and means for optically coupling the branch light conductive channels to the surface.

10. The optical sensor of claim 9, further comprising a demultiplexer and a detector connected to the optical fiber.

11. The optical sensor of claim 9, wherein the means for optically coupling comprise a plurality of lenses, each lens being disposed to transmit light from one of the branch light conductive channels toward the surface, at least a portion of said surface being reflective, and to receive light reflected from said portion of the surface for transmission back through said one branch light conductive channel, said means for reflecting being then further operative to reflect said light back into the optical fiber through the main light conductive channel.

12. The optical sensor of claim 11, wherein the lenses are disposed along one edge of the silicon substrate, adjacent the surface, and wherein the surface has a plurality of reflective areas, each of which are generally aligned with one of the lenses.

13. The optical sensor of claim 12, wherein relative movement between the reflective areas and the lenses causes variation in the light reflected back to the lenses, enabling the optical sensor to sense the relative movement and to sense changes in the position of the surface relative to the optical sensor.

14. The optical sensor of claim 13, wherein the surface is rotated past the lenses.

15. The optical sensor of claim 13, wherein the surface moves linearly past the lenses.

16. The optical sensor of claim 9, wherein the means for reflecting comprise a plurality of dielectric thin film filters, each having a different reflectance wavelength characteristic.

17. The optical sensor of claim 9, wherein the light transmitted through the branch light conductive channels is digitally encoded.

18. The optical sensor of claim 17, wherein each branch light conductive channel conveys light encoded to convey one bit of a digital word.

19. The optical sensor of claim 9, wherein the light transmitted through the branch light conductive channels is modulated to convey analog data encoded on the surface using a range of reflectivity.

20. The optical sensor of claim 9, further comprising a demultiplexer and a plurality of detectors, one detector for each channel of encoded data.

* * * * *

UNITED STATES PATENT AND TRADEMARK OFFICE
CERTIFICATE OF CORRECTION

PATENT NO. : 4,842,357

DATED : June 27, 1989

INVENTOR(S) : Patrick M. Doneen

It is certified that error appears in the above-identified patent and that said Letters Patent is hereby corrected as shown below:

| Column | Line | |
|---|---|---|
| [57] | 21,22 | "refletive" should be --reflective-- |
| 4 | 3 | After the word "reflective" insert --areas 32a on surface 30 encodes one channel of data represented by the reflective-- |

Signed and Sealed this

Fourteenth Day of August, 1990

Attest:

HARRY F. MANBECK, JR.

Attesting Officer    Commissioner of Patents and Trademarks